United States Patent
Kim

(10) Patent No.: US 6,781,966 B1
(45) Date of Patent: Aug. 24, 2004

(54) FORWARD DIRECTION POWER CONTROL METHOD USING BACKWARD DIRECTION POWER CONTROL SUB-CHANNEL FOR MOBILE COMMUNICATION SYSTEM

(75) Inventor: Jin Sook Kim, Kyonggi-Do (KR)

(73) Assignee: Hyundai Electronics Industries Co. Ltd., Kyonggi-Do (KR)

( * ) Notice: Subject to any disclaimer, the term of this patent is extended or adjusted under 35 U.S.C. 154(b) by 895 days.

(21) Appl. No.: 09/643,496

(22) Filed: Aug. 22, 2000

(30) Foreign Application Priority Data

Aug. 31, 1999 (KR) .............................. 99-36634

(51) Int. Cl.⁷ .............................. H04B 7/00; H04Q 7/20
(52) U.S. Cl. .................. 370/311; 370/332; 370/335; 370/342; 455/69; 455/522
(58) Field of Search ................................ 370/311, 328, 370/329, 331, 332, 335, 342; 375/130, 140, 141; 455/38.3, 67.1, 68, 69, 422, 436, 507, 509, 517, 522, 13.4

(56) References Cited

U.S. PATENT DOCUMENTS

| | | | | |
|---|---|---|---|---|
| 5,267,261 A | * | 11/1993 | Blakeney et al. | 370/332 |
| 5,640,414 A | * | 6/1997 | Blakeney et al. | 375/130 |
| 6,058,107 A | * | 5/2000 | Love et al. | 370/332 |
| 6,084,904 A | * | 7/2000 | Wang et al. | 375/130 |
| 6,397,043 B1 | * | 5/2002 | Kang | 455/69 |
| 6,434,367 B1 | * | 8/2002 | Kumar et al. | 455/70 |
| 6,501,958 B1 | * | 12/2002 | Hwang et al. | 455/522 |
| 6,515,975 B1 | * | 2/2003 | Chheda et al. | 370/332 |
| 6,529,482 B1 | * | 3/2003 | Lundby | 370/252 |
| 6,690,944 B1 | * | 2/2004 | Lee et al. | 455/522 |

* cited by examiner

Primary Examiner—Alpus H. Hsu
(74) Attorney, Agent, or Firm—R. Neil Sudol; Henry D. Coleman; William J. Sapone

(57) ABSTRACT

In the present invention, a forward direction power control method using a backward direction power control sub-channel for a mobile communication system is disclosed. The method according to the present invention is directed to rapidly and effectively controlling the power of a base station transmission signal using a power control, sub-channel in a backward direction pilot channel when performing an outer loop and inner loop in a mobile station of a mobile communication system which adapts an IS-2000 CDMA method and rapidly coping with a channel environment and forward direction wireless environment for thereby decreasing the power of a transmission signal of the base station and increasing the capacity of the system.

9 Claims, 7 Drawing Sheets

FORWARD DIRECTION POWER CONTROL METHOD USING BACKWARD DIRECTION POWER CONTROL SUB-CHANNEL FOR MOBILE COMMUNICATION SYSTEM

BACKGROUND OF THE INVENTION

1. Field of the Invention

The present invention relates to a forward direction power control method using a backward direction power control sub-channel for a mobile communication system, and in particular to a forward direction power control method using a backward direction power control sub-channel for a mobile communication system which is capable of rapidly and effectively controlling the power of a base station transmission signal using a backward direction power control sub-channel when performing an outer loop and inner loop in a mobile station of a mobile communication system using an IS-2000 CDMA(Code Division Multiple Access).

2. Description of the Background Art

Generally, as shown in FIG. 1, a mobile communication system using an IS-2000 CDMA includes a mobile station 1, a base station 2 for transmitting and receiving a data with the mobile station 1 and controlling a data wireless transmission and receiving operation with the mobile station 1, and a control station 3 for transmitting and receiving a data with the base station 2 and controlling a data transmission and receiving operation with the base station 2, and a switch station 4.

In the above-described mobile communication system, the forward direction power control operation is implemented by increasing the power of a base station transmission and receiving signal for transmitting to a mobile station which is located in an area in which it is difficult to transmit signals due to a bad signal transmission environment and decreasing the power of a base station transmission and receiving signal for transmitting to a mobile station which is located in an area in which a communication state is good.

The forward direction power control operation is one of the important CDMA techniques capable of transmitting a proper power level of a transmission and receiving signal at the base station, preventing a power consumption and maintaining a good communication quality.

The conventional forward direction power control is classified into two methods based on a band class. In the case that the band class is 0, a communication frame that a mobile station transmits to a base station is checked. As a result of the check, if an error frame exceeds a certain threshold value, a power measuring report message is transmitted to the base station, and the power control is performed based on a frame error ratio at a voice coder at a control station depending on the above-described message.

At this time, when the mobile station transmits a power measuring report message to the base station, the transmission state is in an error state. Therefore, it means that the error frame corresponds to an error threshold value (a corresponding parameter: pwr_rept_thesh) among the received frames and to a normal state. Therefore, it means that the normal frame which does not have an error frame is transmitted to the mobile station by the number of $2^{(\text{the number of the power control report frames}/2)} \times 5$.

Namely, in the case that the frame is in the normal state, when the power measuring report message is not received or the frame of the normal state is continuously maintained after the base station transmits an initial communication frame, in the voice coder block, the down degree (a corresponding parameter: fast_down_delta) of the digital gain is obtained at a period of the timer expiration time (a corresponding parameter: fast_down_time) of the fast down mode for thereby decreasing the power of the transmission and receiving signal of the base station.

In addition, in the case that the frame is in an error state, when the number of the errors is below the error threshold value ( a corresponding parameter: pwr_rept_thresh), the digital gain(a corresponding parameter: small_up_delta) is increased based on a small degree. In the case of the error threshold value, the digital gain (a corresponding parameter: small_up_delta) is increased based on a large degree.

Since the power up and down degrees is different depending on the frame state, the above-described parameter is an important factor for determining the performance of the system for the power control.

In the conventional art, since the number of the power control report frames is 7 (threshold value), about 57 frames are used. Therefore, the power control is performed at a period of about 1.14 seconds for thereby implementing a slow control.

In the case that the band class is 1, the power control is performed using a frame error indication bit. At this time, the error report is performed based on the frame unit of 20 m seconds. Therefore, it is possible to implement a rapid power control compared to the case that the class is 0.

Namely, the frame state is checked whenever the mobile station receives a communication frame, and the frame state information(a icon normal state: 0, and an error state: 1) is allocated to the backward direction communication frame and is transmitted to the control station through the base station. In the control station, the receiving frame is checked. In the case that the frame error indication but is 0, the digital gain of the channel is decreased, and in the case that the frame error indication bit is 1, the digital gain is increased, and a constant frame error ratio is maintained for thereby controlling the power of the base station transmission signal.

In the forward direction power control in which the band class is 1, a value smaller than the up and down value of the forward direction power control in which the band class is 0 is set for thereby implementing an effective power control.

However, In the conventional forward direction power control method based on the band class, the power of the base station transmission signal is adjusted after the control station receives a frame error ratio of the forward direction channel for thereby causing a power control delay. In addition, the slow power control is performed at a period of 20 m~1.14 sec. this case, it is difficult to rapidly cope with a channel environment and forward direction wireless environment, and it is impossible to effectively control the power of the base station transmission signal. Furthermore, an over power consumption of the transmission signal of the base station occurs, and the capacity of the power is decreased.

SUMMARY OF THE INVENTION

Accordingly, it is an object of the present invention to provide a forward direction power control method using a backward direction power control sub-channel for a mobile communication system which is capable of rapidly and effectively controlling the power of a base station transmission signal using a power control, sub-channel in a backward direction pilot channel when performing an outer loop and inner loop in a mobile station of a mobile communication system which adapts an IS-2000 CDMA method and rapidly coping with a channel environment and forward direction wireless environment for thereby decreasing the power of a transmission signal of the base station and increasing the capacity of the system.

In order to achieve the above objects, there is provided a forward direction power control method using a backward direction power control sub-channel for a mobile communication system which includes a channel information and channel transmission and receiving step for transmitting and receiving a channel information for performing an inner loop and a channel corresponding to the channel information for a forward direction power control between a mobile station and a base station, a channel-based receiving power measuring step for measuring a channel-based current receiving power when a mobile station receives a channel in the channel information and channel transmission and receiving step, an outer Loop operation step for determining a channel-based reference receiving power that the mobile station receives as the mobile station performs an outer loop at a period of 20 ms after the channel-based receiving power measuring step, an inner loop operation step for performing an inner loop at a period of 1.25 ms by the mobile station after the outer loop operation step and comparing the current channel-based receiving power measured in the channel-based receiving power measuring step and the channel-based reference receiving power determined in the outer loop operation and determining an information for requesting a power up or down of the base station transmission signal and allocating the determined information to a PCB of the backward direction power control sub-channel, a backward direction power control sub-channel transmission and receiving and power control step for transmitting and receiving a backward direction power control sub-channel including the PCB having an information allocated in the inner loop operation between the mobile station and the base station and controlling the power of the base station transmission signal in accordance with the information allocated to the PCB of the backward direction power control sub-channel, an outer loop report message transmission state determination step in which the mobile station is determined to transmit the outer loop report message to the base station after the backward direction power control sub-channel transmission and receiving and power control step, an outer loop report message transmission and power control step for transmitting and receiving an outer loop report message between the mobile station and the base station in the case that the result determined in the outer loop report message transmission state determination step corresponds to the outer loop report message transmission permission and performing the power control of the base station transmission signal with respect to the base station transmission signal, and an outer loop report message non-transmission step for performing the channel information and channel transmission and receiving step in a state that the mobile station does not transmit the outer loop report message to the base station in the case that the result determined in the outer loop report message transmission state determination step does not correspond to the outer loop report message transmission permission and performing the next steps.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The forward direction power control method using a backward direction power control sub-channel for a mobile communication system according to the present invention will be explained with reference to the accompanying drawings.

Figure 1:
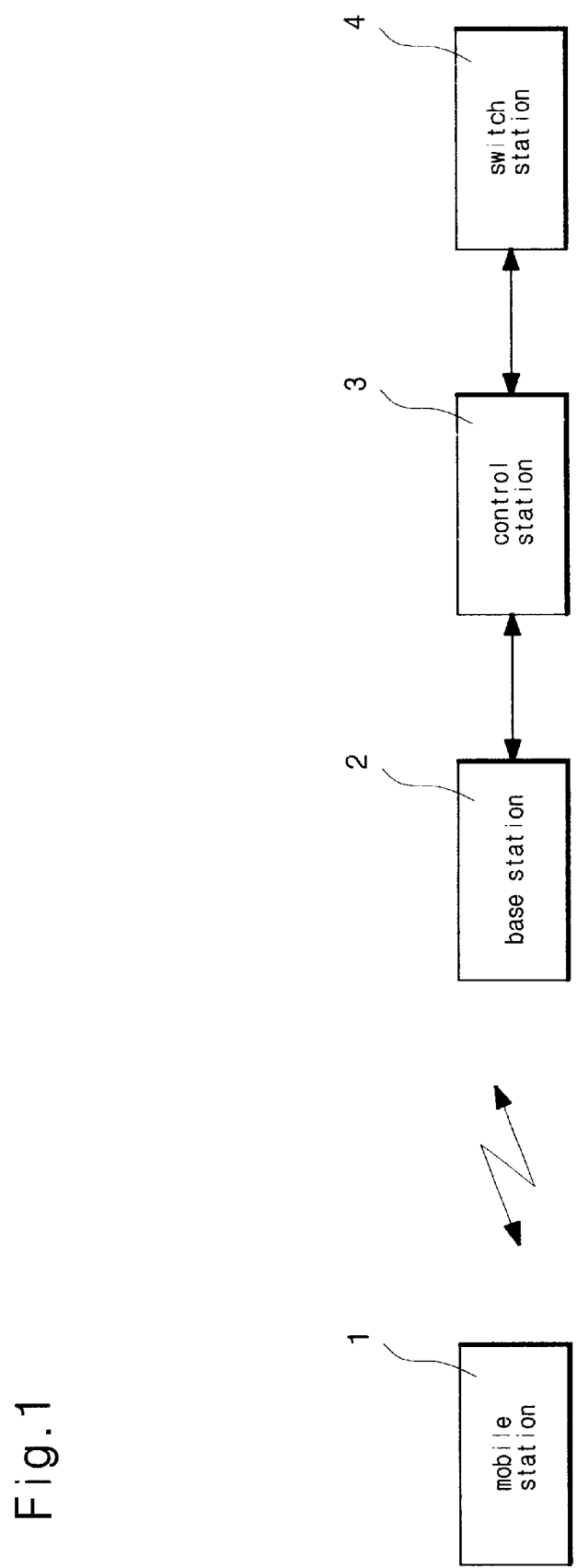
FIG. 1 is a block diagram illustrating a conventional mobile communication system.
Figure 2:
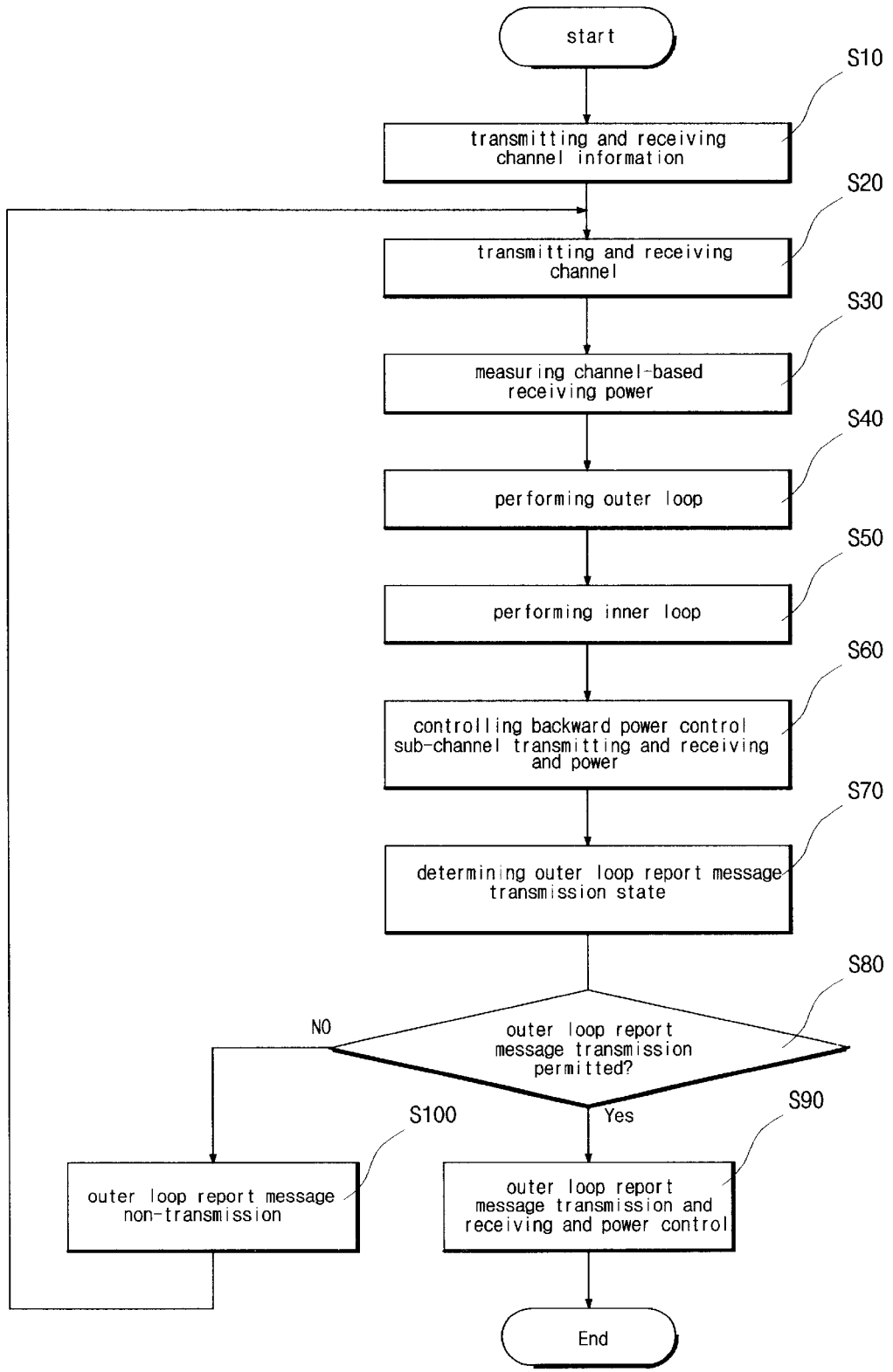
FIG. 2 is a flow chart illustrating a forward direction power control method using a backward direction power control sub-channel for a mobile communication system according to the present invention.

FIG. 2 is a flow chart illustrating the operation of the forward direction power control method using a backward direction power control sub-channel for a mobile communication system according to the present invention. The forward direction power control method according to the present invention will be explained with reference to FIG. 2.

In the case of the forward direction power control according to the present invention, the power control is performed with respect to one forward dedicated control channel in maximum, one forward fundamental channel in maximum, and seven forward supplemental channel in maximum between a certain mobile station and a base station.

In the present invention, the mobile station performs an outer loop and an inner loop for a forward direction power control. The outer loop checks the state of a receiving frame based on each channel at a period of 20 ms and determines a channel-based reference receiving power(related parameter: required_Eb/Nt for an initialization) that the mobile station receives for maintaining a certain frame error ratio (related parameter: REQUIRED_FER).

In addition, in the inner loop, the mobile station checks a channel-based receiving power at a period of 1.25 ms and compares with a reference receiving power (required Eb/Nt). As a result of the comparison, if the channel receiving power is higher than the reference receiving power, "0" is allocated to the power control bit(PCB) of the backward direction power control sub-channel for requesting the power down of the base station transmission signal, and if it is smaller than the reference receiving power, "1" is allocated to the PCB of the backward direction power control sub-channel for requesting a power up of the base station transmission signal.

In a channel information transmission and receiving step S10, a channel information is transmitted to the mobile station so that the base station performs an inner loop for a forward direction power control, whereby the mobile station receives the channel information.

The base station transmits a channel corresponding to the channel information that the base station transmits to the mobile station in the step S10, so that the mobile station receives the channel.

In a channel-based receiving power measuring step S30, the mobile station measures the channel-based current receiving power received in the step S20.

After the channel-based receiving power measuring step S30, in an outer loop operation step S40, the mobile performs an outer loop at a period of 20 ms.

Namely, the mobile station checks the state of the channel-based receiving frame at a period of 20 ms and determines the channel-based reference receiving power that the mobile station receives for maintaining a certain frame error ratio.

In an inner loop operation step S50, the mobile station performs an inner loop at a period of 1.25 ms.

The mobile station compares the current channel-based receiving power measured in the step S30 and the channel-based reference receiving power determined in the step S40 at a period of 1.25 ms and determines an information for requesting a power down or a power up of the base station transmission signal and allocates the thusly determined information to the PCB of the backward direction power control sub-channel.

In a backward direction power control sub-channel transmission and receiving and power control step S60, the mobile station transmits the backward direction power control sub-channel including the PCB having an allocated information in the step S50 to the base station so that the backward-direction power control sub-channel is received, and the base station controls the power of the base station transmission signal in accordance with the information allocated to the PCB of the received backward direction power control sub-channel.

The mobile station receives the power of the base station transmission signal controlled in the backward direction power control sub-channel transmission and receiving and power control step S60.

In an outer loop report message transmission and receiving state determining step S70, the mobile station judges whether there is an inner loop non-performed channel. As a result of the judgement, if there is the inner loop non-performed channel, when a difference between the same and the receiving power of the inner loop performing channel exceeds a certain threshold value, the outer loop report message is determined to be transmitted to the base station.

In an outer loop report message transmission permission judgement step S80, the mobile judges whether the result determined in the step S70 corresponds to an outer loop report message transmission permission. At this time, if the result corresponds to the outer loop report message transmission permission, an outer loop report message transmission and receiving and power control step S90 is performed for thereby performing the power control of the base station transmission signal with respect to the inner loop non-performed channel after the mobile station transmits the outer loop report message to the base station, and the base station receives the same.

In addition, if the result determined in the outer loop report message transmission state determination step S70 does not correspond to the outer loop report message transmission permission, an outer loop report message non-transmission step S100 is performed so that the mobile station does not transmit the outer report message to the base station for thereby repeatedly performing the channel transmission and receiving step S20 and the steps which will be explained later.

In the forward direction power control method using a backward direction power control sub-channel of the mobile communication a system according to the present invention, each operation step will be explained in detail with reference to FIGS. 3 through 7.

Figure 3:
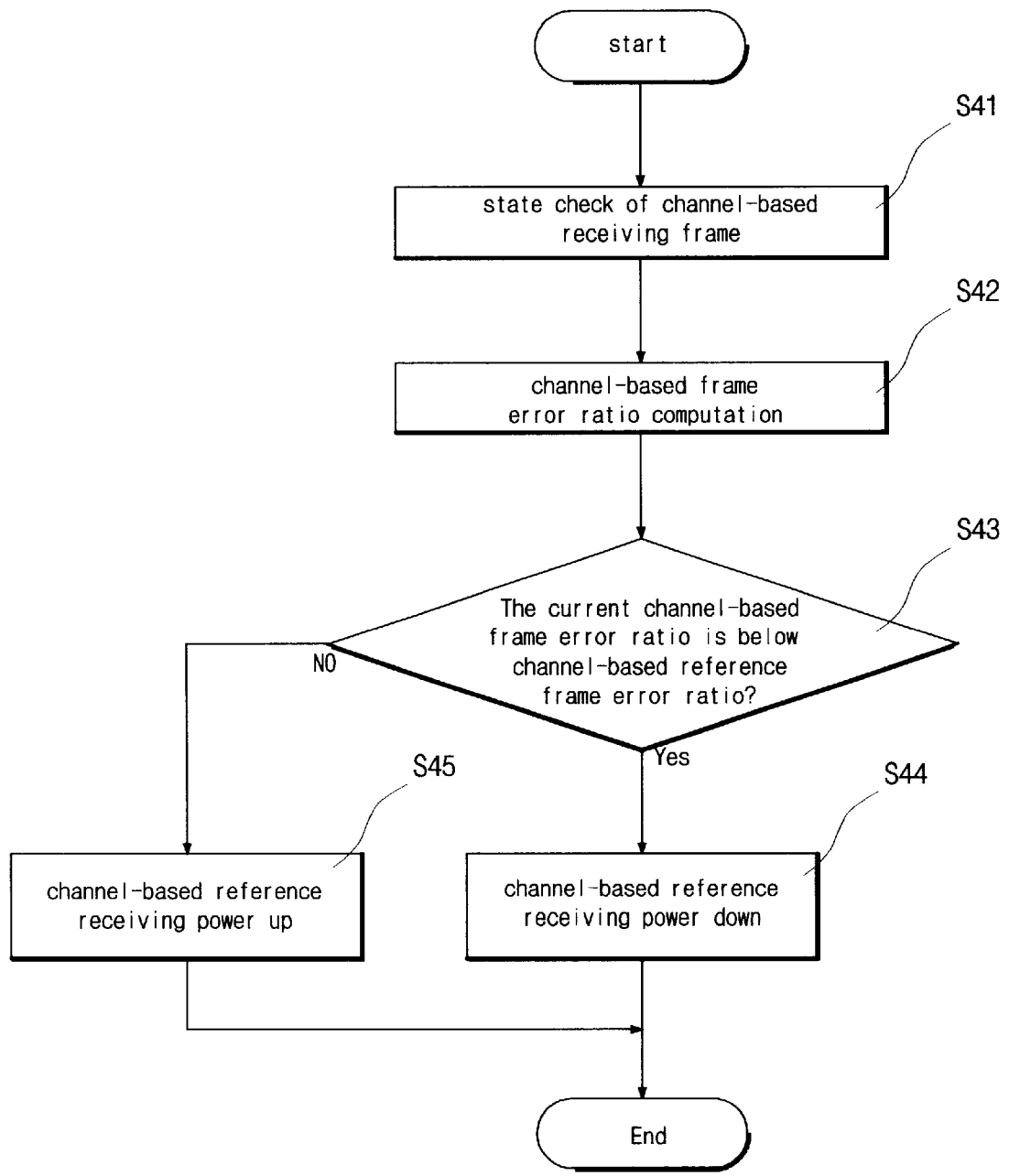
FIG. 3 is a flow chart illustrating an outer loop operation of FIG. 2.

As shown in FIG. 3, in the outer loop operation step S40, the mobile station performs the outer loop at a period of 20 ms. The mobile station checks the state of the channel-based receiving frame in a state check step S41 of the channel-based receiving frame, and a channel-based error ratio computation step S42 is performed for thereby computing the error ratio of the current channel-based frame.

In a frame error ratio comparison step S43, the mobile station judges whether the computed current channel-based frame error ratio is below the channel-based reference frame error ratio. At this time, if the current channel-based frame error ratio is below the channel-based reference frame error ratio, a channel-based reference receiving power down step S44 is performed, and the channel-based reference receiving power is decreased, and if the current channel-based frame error ratio is above the channel-based reference frame error ratio, a channel-based reference receiving power up step S45 is performed for thereby increasing the channel-based reference receiving power and determining the channel-based reference receiving power.

Figure 4:
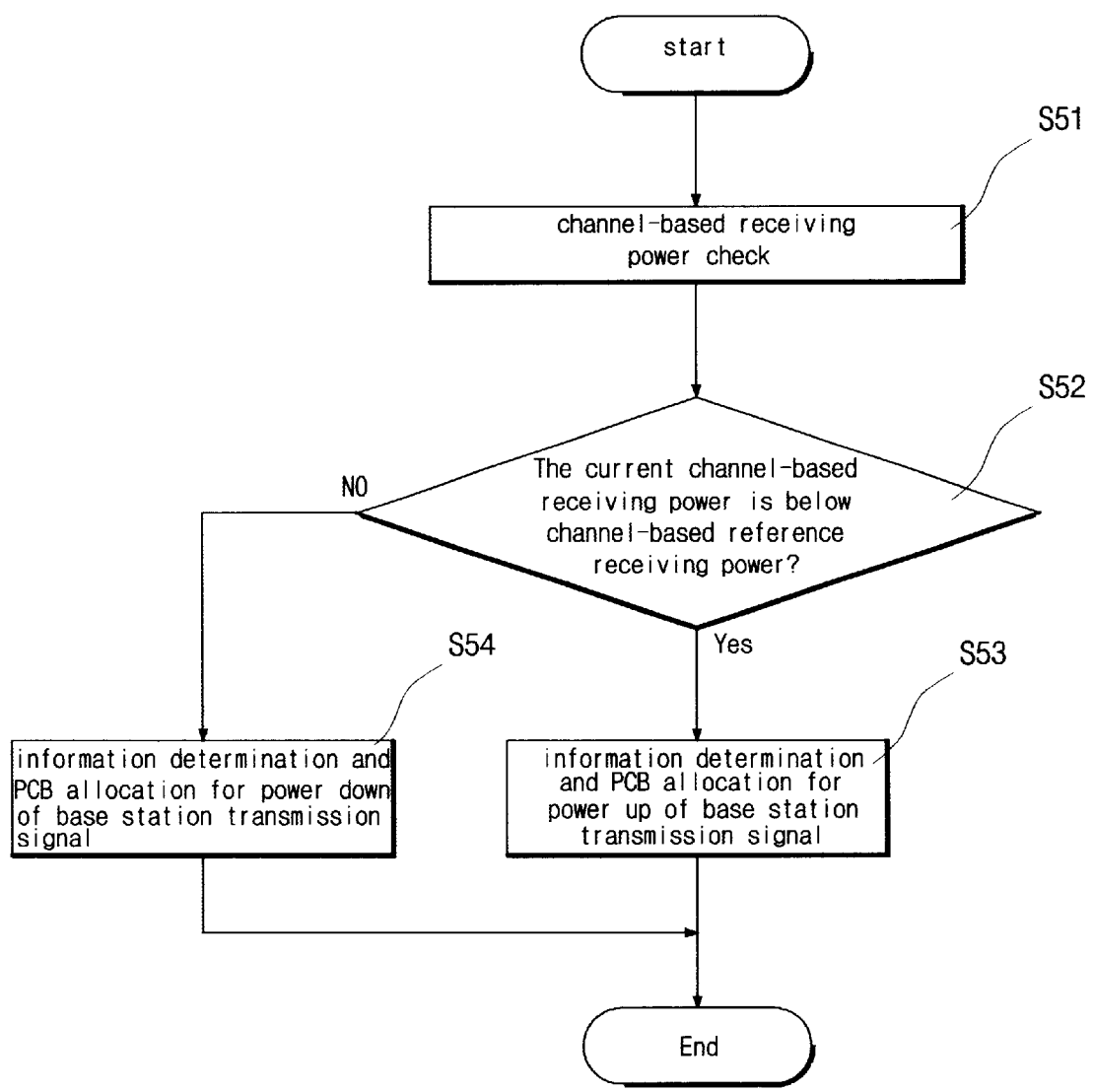
FIG. 4 is a flow chart illustrating an inner loop operation of FIG. 2.

As shown in FIG. 4, in the inner loop operation step S50, the mobile station performs the inner loop at a period of 1.25 ms, and in a channel-based receiving power check step S51, the mobile station checks the current channel-based receiving power, and a channel-based receiving power comparison step S52 is performed, and it is judged whether the current channel-based receiving power checked in the step S51 is below the channel-based reference receiving power determined in the channel-based reference receiving power down or up steps S44 and S45 of the outer loop operation step S40.

If the current channel-based receiving power is below the channel-based reference receiving power in the channel-based receiving power comparison step S52, an information determination and PCB allocation step S53 is performed for a power up of the base station transmission signal. The mobile station determines "1" as an information for requesting the power up of the base station transmission signal and allocates "1" to the PCB of the backward direction power control sub-channel, and if the current channel-based receiving power exceeds the channel-based receiving power in the channel-based receiving power comparison step S52, an information determination and PCB allocation step S54 is performed for a power down of the base station transmission signal, and the mobile station determines "0" as an information for requesting the power down of the base station transmission signal and allocates "0" to the PCB of the sub-channel of the backward direction power control sub-channel.

Figure 5:
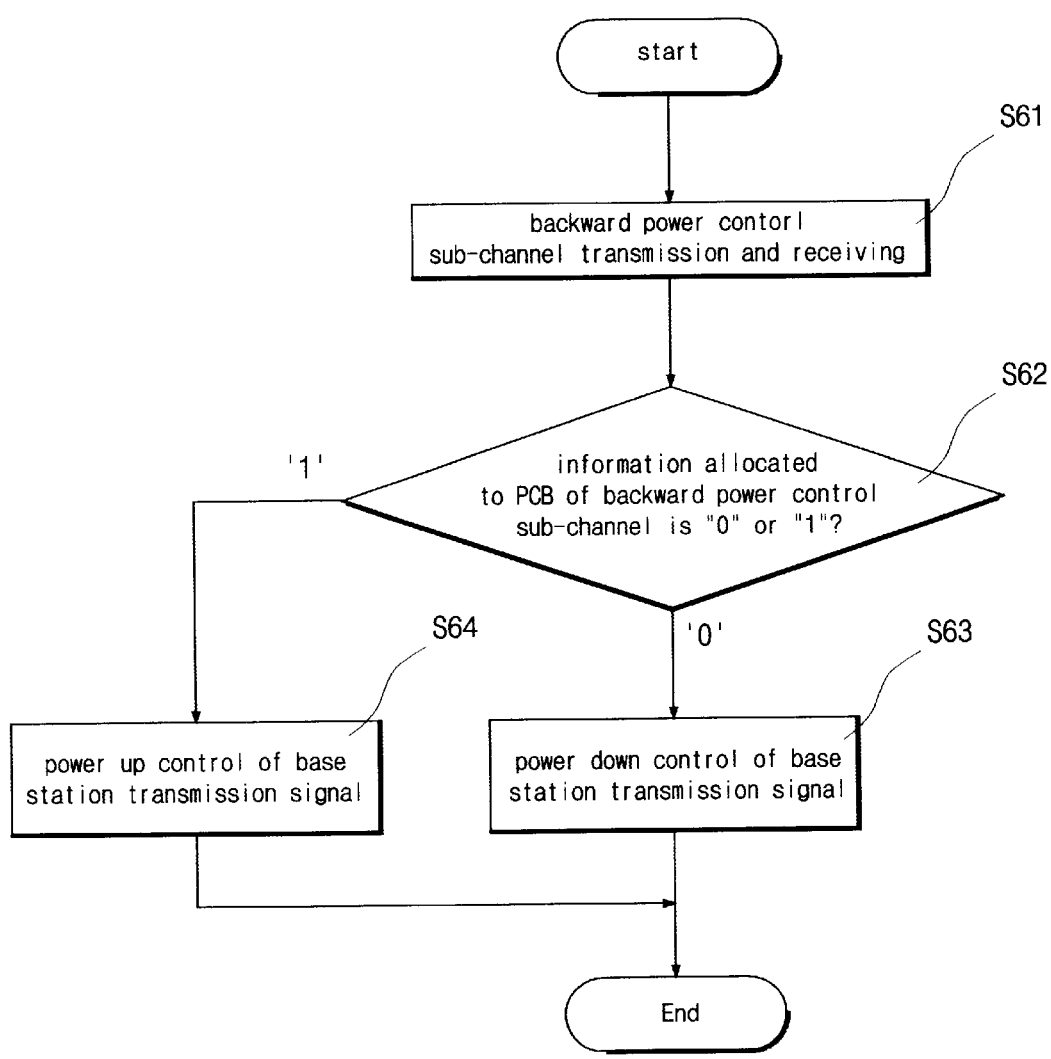
FIG. 5 is a flow chart illustrating a backward direction power control sub-channel transmission and receiving and power control operation of FIG. 2.

As shown in FIG. 5, in the backward direction power control sub-channel transmission and receiving and power control step S60, the mobile station transmits a backward direction power control sub-channel including the PCB having an information allocated in the information determination and PCB allocation steps S53 and 54 for a power up or down of the base station transmission signal of the inner loop operation step S50 in a backward direction power control sub-channel transmission and receiving step S61. When the backward direction power control sub-channel is received, a backward direction power control sub-channel information verification step S62 is performed, and it is judged whether the information allocated to the PCB of the backward direction power control sub-channel received in the step S61 is "0" or "1".

In the backward direction power control sub-channel information verification step S62, if the information allocated to the PCB of the backward direction power control sub-channel is "0", a power down control step S63 is performed for the base station transmission signal for thereby decreasing the power of the base station transmission signal, and if the information allocated to the PCB of the backward direction power control sub-channel is "1", a power up control step S64 is performed for the base station transmission signal for thereby increasing the power of the base station transmission signal and controlling the power of the base station transmission signal.

At this time, in the case that "0" or "1" information which exceeds a threshold value is continuously received, the power up and down value of the base station transmission signal is increased for thereby controlling the power of the base station transmission signal, and in the case that the information which does not exceed a certain threshold value is not received, the power up and down value of the base station transmission signal is decreased for thereby controlling the power of the base station transmission signal.

Next, in the outer loop report message transmission state determination step S70, the outer loop report message is transmitted to the base station for the channel which does not transmit the information to the PCB of the backward power control sub-channel due to the non-performed inner loop.

Namely, the backward direction power control sub-channel transmits a power control information with respect to two forward direction channels in maximum. Since a multiple channel may be used between the base station and a certain mobile station, that the power control information may not be transmitted.

Figure 6:
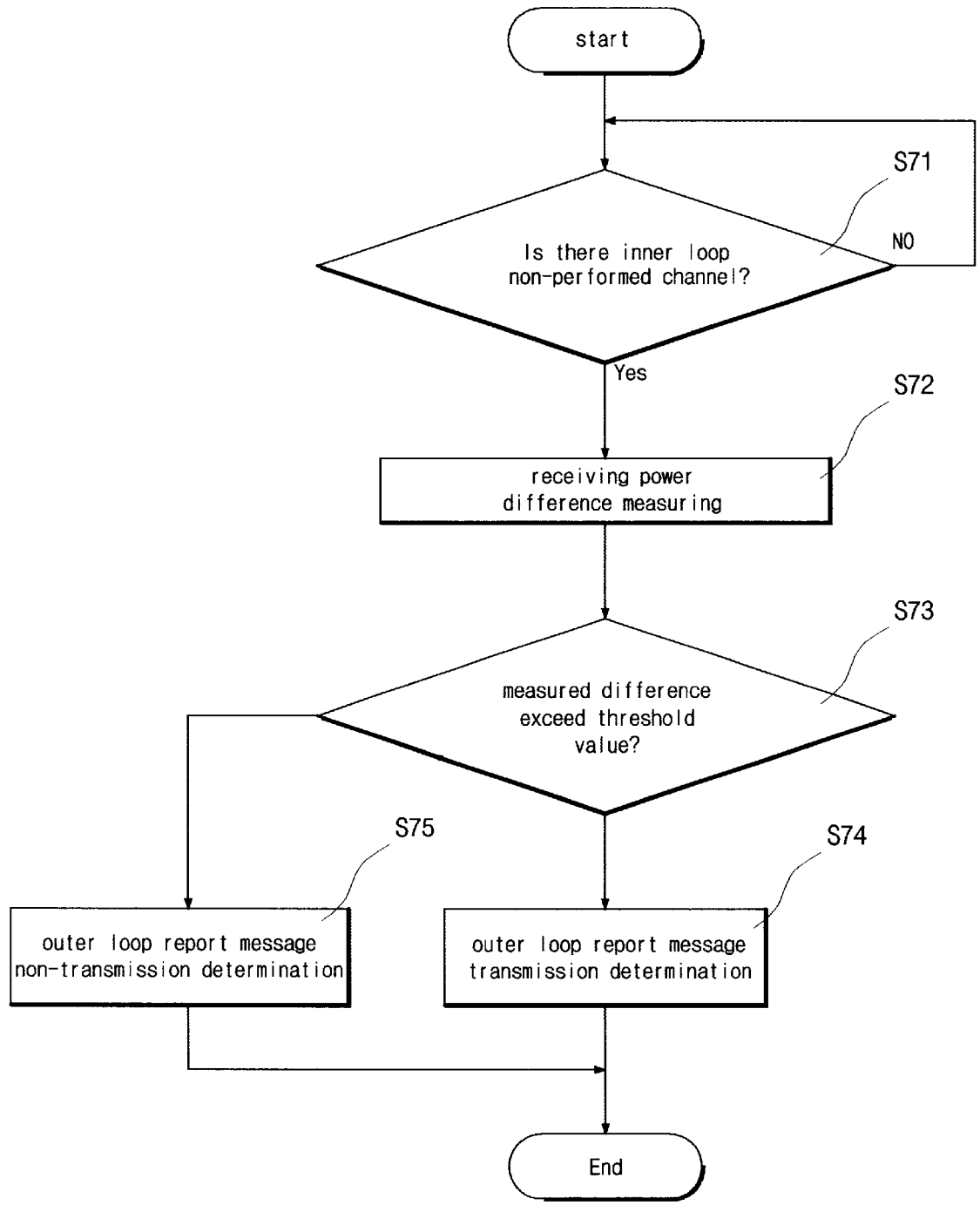
FIG. 6 is a flow chart illustrating an outer loop report message transmission state of FIG. 2.
Figure 7:
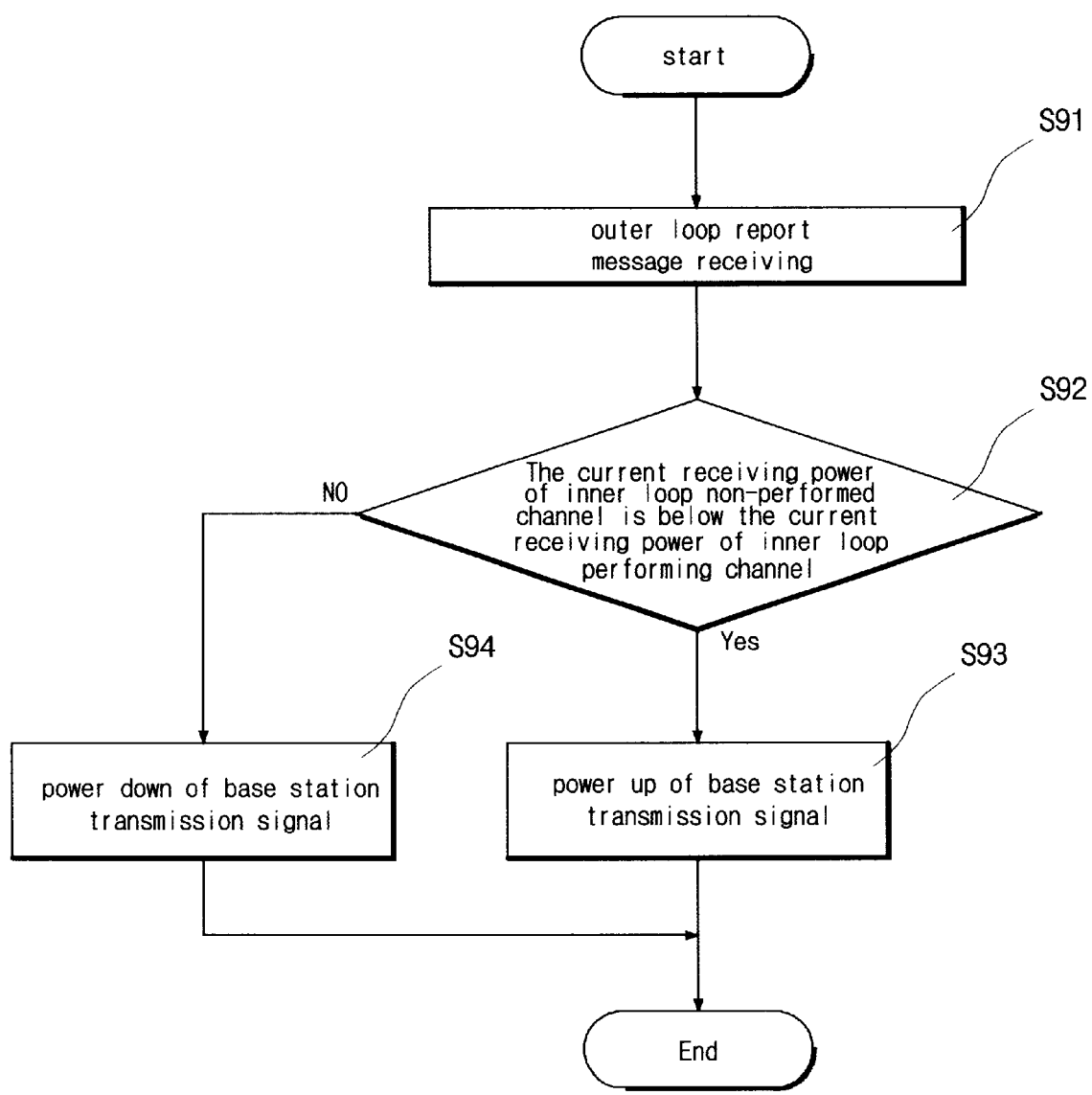
FIG. 7 is a flow chart illustrating an outer loop report message transmission and receiving and power control operation of FIG. 2.

As shown in FIG. 6, in an inner non-performed channel existence judgement step S71, the mobile station judges whether there is an inner loop non-performed channel. At this time, if there is the inner loop non-performed channel, a receiving power difference measuring step S72 is performed, so that the difference between the current receiving power of the inner loop non-performed channel and the current receiving power of the inner loop operation channel is measured.

In a threshold value comparison step S73, the mobile station judges whether the difference measured in the receiving power difference measuring step S72 exceeds the threshold value or not. At this time, if the difference exceeds the threshold value, an outer loop report message transmission determination sep S74 is performed, and the outer report message is determined to be transmitted to the base station. If the difference is below the threshold value, an outer loop report message non-transmission determination step S75 is performed, and it is determined that the outer loop report message is not transmitted to the base station.

In the outer loop report message transmission and receiving and power control step S90, the base station receives an outer loop report message transmitted from the mobile station and performs the power control with respect to the inner loop non-performed channel. In an outer loop report message receiving step S91, when the base station receives the outer loop report message from the mobile station, a certain correction is adapted with respect to the channel which does not transmit the power control information based on the outer loop report message, and the power of the base station transmission signal is determined.

In a receiving power comparison step S92, it is judged whether the current receiving power of the inner loop non-performed channel is below the current receiving power of the inner loop operation channel. At this time, if the current receiving power of the inner loop non-performed channel is below the current receiving power of the inner loop operation channel, a power up step S93 is performed for the base station transmission signal, and the power of the base station transmission signal is increased, and if the current receiving power of the inner loop non-performed channel exceeds the current receiving power of the inner loop operation channel, a power down step S94 is performed for the base station transmission signal, so that the power of the base station transmission signal is decreased with respect to the inner loop non-performed channel, and the power of the base station transmission signal is controlled with respect to the inner loop non-performed channel.

As described above, in the present invention, it is possible to rapidly control the power of the base station transmission signal using a backward direction power control sub-channel. In particular, the power control is effectively performed with respect to the multiple channels, and the channel-based error ratio is constantly maintained for thereby implementing a rapid power control and coping the rapidly changing channel environment. In addition, it is possible to decrease the power of the base station transmission signal and to increase the capacity of the system.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A forward direction power control method using a backward direction power control sub-channel for a mobile communication system, comprising the steps of:

a channel information and channel transmission and receiving step for transmitting and receiving a channel information for performing an inner loop and a channel corresponding to the channel information for a forward direction power control between a mobile station and a base station;

a channel-based receiving power measuring step for measuring a channel-based current receiving power when a mobile station receives a channel in the channel information and channel transmission and receiving step;

an outer loop operation step for determining a channel-based reference receiving power that the mobile station receives as the mobile station performs an outer loop at a period of 20 ms after the channel-based receiving power measuring step;

an inner loop operation step for performing an inner loop at a period of 1.25 ms by the mobile station after the outer loop operation step and comparing the current channel-based receiving power measured in the channel-based receiving power measuring step and the channel-based reference receiving power determined in the outer loop operation and determining an information for requesting a power up or down of the base station transmission signal and allocating the determined information to a power control bit (PCB) of the backward direction power control sub-channel;

a backward direction power control sub-channel transmission and receiving and power control step for transmitting and receiving a backward direction power control sub-channel including the PCB having an information allocated in the inner loop operation between the mobile station and the base station and controlling the power of the base station transmission signal in accordance with the information allocated to the PCB of the backward direction power control sub-channel;

an outer loop report message transmission state determination step in which the mobile station is determined to transmit the outer loop report message to the base station after the backward direction power control sub-channel transmission and receiving and power control step;

an outer loop report message transmission and power control step for transmitting and receiving an outer loop report message between the mobile station and the base station in the case that the result determined in the outer loop report message transmission state determination step corresponds to the outer loop report message transmission permission and performing the power control of the base station transmission signal with respect to the base station transmission signal; and an outer loop report message non-transmission step for performing the channel information and channel transmission and receiving step in a state that the mobile station does not transmit the outer loop report message to the base station in the case that the result determined in the outer loop report message transmission state determination step does not correspond to the outer loop report message transmission permission and performing the next steps.

2. The method of claim 1, wherein said outer loop operation step includes the steps of:

a channel-based receiving frame state check and frame error ratio computation step in which the mobile station checks the state of each channel-based receiving frame for computing the current channel-based frame error ratio in accordance with the state of the checked channel-based receiving frame;

a frame error ratio comparison step for judging whether the current channel-based frame error ratio computed in the channel-based receiving frame state check and frame error ratio computation step is below a channel-based reference frame error ratio;

a channel-based reference receiving power down step for determining the channel-based reference receiving power by decreasing the channel-based reference receiving power when the current channel-based frame error ratio is below the channel-based reference frame error ratio as a result of the frame error ratio comparison step; and a channel-based reference receiving power up step for determining the channel-based reference receiving power by increasing the channel-based reference receiving power when the current channel-based frame error ratio exceeds the channel-based reference frame error ratio as a result of the comparison of the frame error ratio comparison step.

3. The method of claim 1, wherein said inner loop operation step includes:

a channel-based receiving power check step in which the mobile station checks the current channel-based receiving power;

a channel-based receiving power comparison step for judging whether the current channel-based receiving power checked in the channel-based receiving power check step is below the channel-based reference receiving power determined in the channel-based reference receiving power down or up step of the outer loop operation step;

an information determination and PCB allocation step for determining an information for requesting a power up of the base station transmission signal when the current channel-based receiving power is below the channel-based reference receiving power as a result of the channel-based receiving power comparison step and allocating the determined information to the backward direction power control sub-channel; and an information determination and PCB allocation step for determining an information for requesting a power down of the base station transmission signal when the current channel-based receiving power exceeds the channel-based reference receiving power as a result of the channel-based receiving power comparison step and decreasing the power of the base station transmission signal for allocating the determined information to the PCB of the backward direction power control sub-channel.

4. The method of claim 3, wherein in the information determination and PCB allocation step for a power up of the base station transmission signal, the information for requesting a power up of the base station transmission signal is "1".

5. The method of claim 3, wherein in the information determination and PCB allocation step for a power up of the base station transmission signal, the information for requesting a power down of the base station transmission signal is "0".

6. The method of claim 1, wherein said backward direction power control sub-channel transmission and receiving and power control step includes the steps of:

a backward direction power control sub-channel receiving step for receiving the backward direction power control sub-channel including the PCB having an information allocated in the information determination and PCB allocation step from the mobile station for increasing or decreasing the power of the base station transmission signal of the inner loop operation step in the base station;

a backward direction power control sub-channel information verification step for verifying an information allocated to the PCB of the backward direction power control sub-channel received in the backward direction power control sub-channel receiving step;

a base station transmission signal power down control step for decreasing the power of the base station transmission signal in the case that the information allocated to the PCB of the backward direction power control sub-channel is "0" as a result of the backward direction power control sub-channel information verification step; and a base station transmission signal power up control step for increasing the power of the base station transmission signal in the case that the information allocated to the PCB of the backward direction power control sub-channel is "1" as a result of the backward direction power control sub-channel information verification step.

7. The method of claim 6, wherein in the backward direction power control sub-channel receiving step, in the case that the information of "0" or "1" allocated to the PCB of the backward direction power control sub-channel continuously exceeds a certain threshold value, the power up value of the base station transmission signal is increased, and the power of the base station transmission signal is controlled, and in the case that the information does not continuously exceed the threshold value, the power up and down value of the vase station transmission signal is decreased for thereby controlling the power of the base station transmission signal.

8. The method of claim 1, wherein said outer loop report message transmission state determination step includes the steps of:

an inner loop non-performed channel existing check and receiving power difference measuring step in which the mobile station judges whether there is an inner loop non-performed channel for measuring the difference between the current receiving power of the inner loop non-performed channel and the current receiving power of the inner loop performed channel in the case that there is a loop non-performed channel as a result of the judgement;

a threshold value comparison step for judging whether the difference measured in the inner loop non-performed channel existing check and receiving power difference measuring step exceeds the threshold value;

an outer loop report message transmission determination step for transmitting an outer loop report message to the base station when the measured difference exceeds the threshold value as a result of the comparison of the threshold value comparison step; and an outer loop report non-transmission determination step in which the outer loop report message is not transmitted to the base station when the measured difference is below the threshold value as a result of the threshold value comparison step.

9. The method of claim 1, wherein said outer loop report message transmission and receiving and power control step includes:

a receiving power comparison step in which the base station receives an outer loop report message from the mobile station, and it is judged whether the current receiving power of the inner loop non-performed channel is below the current receiving power of the inner loop performing channel based on the information of the received outer loop report message;

a base station transmission signal power up step for increasing the power of the base station transmission signal with respect to the inner loop non-performed channel when the current receiving power of the inner loop non-performed channel is below the current receiving power of the inner loop performing channel as a result of the receiving power comparison step; and a base station transmission signal power down step for decreasing the power of the base station transmission signal with respect to the inner loop non-performed channel when the current receiving power of the inner loop non-performed channel exceeds the current receiving power of the inner loop performing channel as a result of the receiving power comparison step.

* * * * *